(12) United States Patent
Binning et al.

(10) Patent No.: US 10,491,378 B2
(45) Date of Patent: Nov. 26, 2019

(54) DECENTRALIZED NODAL NETWORK FOR PROVIDING SECURITY OF FILES IN DISTRIBUTED FILESYSTEMS

(71) Applicant: StreamSpace, LLC, Austin, TX (US)

(72) Inventors: Robert Binning, Chatham, NJ (US); James Baggett, Austin, TX (US)

(73) Assignee: StreamSpace, LLC, Austin, TX (US)

( * ) Notice: Subject to any disclaimer, the term of this patent is extended or adjusted under 35 U.S.C. 154(b) by 307 days.

(21) Appl. No.: 15/638,539

(22) Filed: Jun. 30, 2017

(65) Prior Publication Data

US 2018/0139042 A1   May 17, 2018

Related U.S. Application Data

(60) Provisional application No. 62/422,641, filed on Nov. 16, 2016.

(51) Int. Cl.
| | |
|---|---|
| *H04L 9/06* | (2006.01) |
| *G06F 21/62* | (2013.01) |
| *G06Q 20/36* | (2012.01) |
| *H04L 29/06* | (2006.01) |
| *H04W 12/08* | (2009.01) |

(52) U.S. Cl.
CPC ........ *H04L 9/0643* (2013.01); *G06F 21/6218* (2013.01); *G06Q 20/3678* (2013.01); *H04L 63/0428* (2013.01); *H04L 63/06* (2013.01); *H04L 63/10* (2013.01); *H04W 12/08* (2013.01)

(58) Field of Classification Search
CPC ....... H04L 9/0643; H04L 63/06; H04L 63/10; G06F 21/6218; G06Q 20/3678
USPC .......................................................... 726/26
See application file for complete search history.

(56) References Cited

U.S. PATENT DOCUMENTS

| | | | |
|---|---|---|---|
| 8,522,073 B2 | 8/2013 | Cohen | |
| 9,413,735 B1 * | 8/2016 | Hird | ........................ H04L 63/08 |
| 10,402,793 B2 * | 9/2019 | Haldenby | ............ G06Q 10/103 |

(Continued)

FOREIGN PATENT DOCUMENTS

| | | |
|---|---|---|
| WO | 2014144182 A2 | 9/2014 |
| WO | 2015077378 | 5/2015 |

(Continued)

OTHER PUBLICATIONS

International Search Report issued in connection with International application No. PCT/US17/61449 dated Jan. 29, 2018.

(Continued)

*Primary Examiner* — Jason K Gee
*Assistant Examiner* — Dereena T Cattungal
(74) *Attorney, Agent, or Firm* — Davidson, Davidson & Kappel, LLC

(57) ABSTRACT

A secure method of maintaining and accessing files (for example, multimedia files) is provided. Each file is divided into fragments or slices and each slice is encrypted and stored on a separate node. Each node is also required to maintain an instance of a public block-chain (or distributed ledger) which holds conventional block-chain transaction information for managing payment for access to the files. Preferably, each node is also paid in digital currency both as a conventional block-chain miner for maintaining the public block-chain and also for maintaining the slices.

16 Claims, 10 Drawing Sheets

(56) References Cited

U.S. PATENT DOCUMENTS

| | | | |
|---|---|---|---|
| 2009/0193252 A1* | 7/2009 | Wajs | G06F 21/606 |
| | | | 713/165 |
| 2013/0347079 A1 | 12/2013 | Gladwin et al. | |
| 2015/0304306 A1 | 10/2015 | Ponsford et al. | |
| 2015/0310219 A1 | 10/2015 | Haager et al. | |
| 2015/0356555 A1 | 12/2015 | Pennanen | |
| 2015/0371224 A1* | 12/2015 | Lingappa | G06Q 20/3829 |
| | | | 705/71 |
| 2016/0028552 A1 | 1/2016 | Spanos et al. | |
| 2016/0261404 A1 | 9/2016 | Ford et al. | |
| 2016/0286920 A1 | 9/2016 | Fisher et al. | |
| 2016/0292672 A1 | 10/2016 | Fay et al. | |
| 2016/0300234 A1 | 10/2016 | Moss-Pultz et al. | |
| 2016/0330034 A1 | 11/2016 | Back et al. | |
| 2017/0177898 A1* | 6/2017 | Dillenberger | G06F 16/2379 |

FOREIGN PATENT DOCUMENTS

| | | |
|---|---|---|
| WO | 2015175411 A1 | 11/2015 |
| WO | 2016128491 | 8/2016 |

OTHER PUBLICATIONS

International Preliminary Report issued in connection with Intentional application No. PCT/US2017/061449 dated May 21, 2019.
AES Implementations, Wikipedia, https://en.wikipedia.org/w/index.php?title=AES_implementations&oldid=748209257, Nov. 10, 2016, pp. 1-5.
J. Benet, IPFS—Content Addressed, Versioned, P2P File System (Draft 3), pp. 1-11.
S. Nakamoto, Bitcoin: A Peer-to-Peer Electronic Cash System, www.bitcoin.org, pp. 1-9.
Manual for HJSplit for Windows, www.freebyte.com/hjsplit, 1995, pp. 1-31.
J. Wallen, How to Easily Encrypt/Decrypt a File in Linux with gpg, www.techrepublic.com, May 24, 2016, pp. 1-8.
G. Comte, Library Development for Storj Cloud Clients in Unsupposed Environments, Hame University of Applied Sciences, 2017, pp. 1-73.
1xSplit, http://lxsplit.sourceforge.net/, Oct. 17, 2008, pp. 1-2.
S. Wilkinson, Storj a Peer-to-Peer Cloud Storage Network, Dec. 15, 2014, pp. 1-18.
S. Wilkinson, Storj a Peer-to-Peer Cloud Storage Network, Dec. 15, 2016, pp. 1-37.

* cited by examiner

- Assuming Constant # of Files (3,500) and No Compression

| Nodes | Slices | Slice Size (KB) | File Size Requirement Per Node (MB) |
|---|---|---|---|
| 1,000 | 3,500,000 | 200 | 700 |
| 2,000 | 7,000,000 | 100 | 350 |
| 3,000 | 10,500,000 | 66.66666667 | 233.3333333 |
| 4,000 | 14,000,000 | 50 | 175 |
| 5,000 | 17,500,000 | 40 | 140 |
| 100,000 | 350,000,000 | 2 | 7 |
| 1,000,000 | 3,500,000,000 | 0.2 | 0.7 |

Figure 2

*Note, File instance is only destroyed if specified as a lease/stream and not a purchase. If purchased, the encrypted file instance becomes permanent with only the owner having access to the decrypt key.

FIGURE 6A

- Assuming Constant # of Nodes and No Compression (1,000)

Slices = Files * 1000, File Size Per Slice (in GB) = (File Size (in GB) / Slices) & File Size Per Node (in GB) = File size per slice (in GB) * number of nodes.

| Files | File Size Network (GB) | Slices | File Size per Slice (GB) | File Size Requirement Per Node (GB) |
|---|---|---|---|---|
| 3,500 | 700 | 3,500,000 | 0.0002 | 0.7 |
| 3,600 | 720 | 3,600,000 | 0.0002 | 0.72 |
| 3,700 | 740 | 3,700,000 | 0.0002 | 0.74 |
| 3,800 | 760 | 3,800,000 | 0.0002 | 0.76 |
| 3,900 | 780 | 3,900,000 | 0.0002 | 0.78 |
| 4,000 | 800 | 4,000,000 | 0.0002 | 0.8 |
| 4,100 | 820 | 4,100,000 | 0.0002 | 0.82 |
| 4,200 | 840 | 4,200,000 | 0.0002 | 0.84 |
| 4,300 | 860 | 4,300,000 | 0.0002 | 0.86 |
| 4,400 | 880 | 4,400,000 | 0.0002 | 0.88 |
| 4,500 | 900 | 4,500,000 | 0.0002 | 0.9 |
| 1,000,000.00 | 200,000.00 | 1,000,000,000.00 | 0.0002 | 200 |

- Assuming Constant # of Files (3,500) and No Compression   FIGURE 6B

| Nodes | Slices | Slice Size (KB) | File Size Requirement Per Node (MB) |
|---|---|---|---|
| 1,000 | 3,500,000 | 200 | 700 |
| 2,000 | 7,000,000 | 100 | 350 |
| 3,000 | 10,500,000 | 66.66666667 | 233.3333333 |
| 4,000 | 14,000,000 | 50 | 175 |
| 5,000 | 17,500,000 | 40 | 140 |
| 100,000 | 350,000,000 | 2 | 7 |
| 1,000,000 | 3,500,000,000 | 0.2 | 0.7 |

- Changing # of Nodes and Files with No Compression   FIGURE 6C

| Nodes | Files | Slices | Size of Slice (KB) | File Size Node (MB) |
|---|---|---|---|---|
| 1,000 | 5,000 | 5,000,000.00 | 140.00 | 700 |
| 2,000 | 10,000 | 20,000,000.00 | 35.00 | 350 |
| 3,000 | 15,000 | 45,000,000.00 | 15.56 | 233.3333333 |
| 4,000 | 20,000 | 80,000,000.00 | 8.75 | 175 |
| 5,000 | 25,000 | 125,000,000.00 | 5.60 | 140 |
| 6,000 | 30,000 | 180,000,000.00 | 3.89 | 116.6666667 |
| 7,000 | 35,000 | 245,000,000.00 | 2.86 | 100 |
| 8,000 | 40,000 | 320,000,000.00 | 2.19 | 87.5 |
| 9,000 | 45,000 | 405,000,000.00 | 1.73 | 77.77777778 |
| 1,000,000 | 5,000,000 | 5,000,000,000,000.00 | 0.00014 | 0.7 |

• Assume Constant # of Nodes (1,000) and No Compression: FIGURE 7A

| Files | File Size Network (GB) | Slices | File Size per Slice (KB) | File Size Requirement Per Node (GB) |
|---|---|---|---|---|
| 100,000 | 3,500 | 100,000,000 | 35 | 3.5 |
| 200,000 | 7,000 | 200,000,000 | 35 | 7 |
| 300,000 | 10,500 | 300,000,000 | 35 | 10.5 |
| 400,000 | 14,000 | 400,000,000 | 35 | 14 |
| 500,000 | 17,500 | 500,000,000 | 35 | 17.5 |
| 1,000,000 | 35,000 | 1,000,000,000 | 35 | 35 |
| 5,000,000 | 175,000 | 5,000,000,000 | 35 | 175 |
| 10,000,000 | 350,000 | 10,000,000,000 | 35 | 350 |
| 20,000,000 | 700,000 | 20,000,000,000 | 35 | 700 |
| 40,000,000 | 1,400,000 | 40,000,000,000 | 35 | 1400 |
| 60,000,000 | 2,100,000 | 60,000,000,000 | 35 | 2100 |
| 80,000,000.00 | 2,800,000.00 | 80,000,000,000.00 | 35 | 2800 |

• Assume Constant # of files (100,000) and No Compression: FIGURE 7B

| Nodes | Slices | Slice Size (KB) | File Size Requirement Per Node (MB) |
|---|---|---|---|
| 1,000 | 10,000,000 | 35 | 122.5 |
| 2,000 | 20,000,000 | 17.5 | 61.25 |
| 3,000 | 30,000,000 | 11.66666667 | 40.83333333 |
| 4,000 | 40,000,000 | 8.75 | 30.625 |
| 5,000 | 50,000,000 | 7 | 24.5 |
| 100,000 | 1,000,000,000 | 0.35 | 1.225 |
| 1,000,000 | 10,000,000,000 | 0.035 | 0.1225 |

FIGURE 7C

- Changing # of Nodes and Files with No Compression:

| Nodes | Files | Slices | Size of Slice (KB) | File Size Node (MB) |
|---|---|---|---|---|
| 1,000 | 100,000 | 100,000,000.00 | 3.50 | 350 |
| 2,000 | 200,000 | 400,000,000.00 | 1.75 | 350 |
| 3,000 | 300,000 | 900,000,000.00 | 1.17 | 350 |
| 4,000 | 400,000 | 1,600,000,000.00 | 0.88 | 350 |
| 5,000 | 500,000 | 2,500,000,000.00 | 0.70 | 350 |
| 6,000 | 1,000,000 | 6,000,000,000.00 | 0.58 | 583.3333333 |
| 7,000 | 2,000,000 | 14,000,000,000.00 | 0.50 | 1000 |
| 8,000 | 4,000,000 | 32,000,000,000.00 | 0.44 | 1750 |
| 9,000 | 8,000,000 | 72,000,000,000.00 | 0.39 | 3111.111111 |
| 1,000,000 | 16,000,000 | 16,000,000,000,000.00 | 0.00350 | 56 |
| 2,000,000 | 1,000,000 | 2,000,000,000,000.00 | 0.0018 | 1.75 |

- Ideal, although unnecessary, the network is most optimized when there are more active nodes than there are files on the network.

DECENTRALIZED NODAL NETWORK FOR PROVIDING SECURITY OF FILES IN DISTRIBUTED FILESYSTEMS

This application claims priority to U.S. Provisional Application Ser. No. 62/422,641, filed Nov. 16, 2016, and entitled Decentralized Nodal Network For Providing Security of Files in Distributed Filesystems, the entire disclosure of which is hereby incorporated by reference.

FIELD OF THE INVENTION

This application relates to improvements for providing secure storage and transmission of files in a computer system utilizing encryption and block-chain techniques.

BACKGROUND

Cryptographic systems are known for providing secure transmission of files such as media files. Examples of media files include, for example, audio files, image files, and video files. Public key cryptography or asymmetric cryptography refers to cryptographic systems that use pairs of keys: public keys which may be disseminated widely, and private keys which are known only to the owner.

Cryptographic systems are also used in financial transactions. One such system is known as "bit coin," described in Satoshi Nakamoto, Bitcoin: A Peer-to-Peer Electronic Cash System, www.bitcoin.org (2009), incorporated herein by reference in its entirety. In the bitcoin system, an important element is the block-chain, which is a type of distributed ledger. The block-chain records financial transactions which have been executed using bitcoins. No central authority intermediates the recording of financial transactions in the bitcoin system. Rather, bitcoin software is installed on a large number of devices (which may or may not be computer servers) connected via the Internet. The financial transactions (which can be considered in the form: "payer A wants to send Z bitcoins to payee B" are broadcast to devices on the network. The devices validate these financial transactions, add a record of them to their copy of the block chain, and then broadcast these block-chain additions to other servers of the network. Each block in a block chain contains hold batches of transactions. Each block includes the hash of the prior block in the block-chain, linking the two. In addition to a secure hash based history, a block-chain database has a specified algorithm for scoring different versions of the history so that one with a higher value can be selected over others. Furthermore, block-chains use various time-stamping schemes, such as proof-of-stake or proof of work to serialize additions or changes in the block-chain.

As noted above, a block-chain is a type of distributed ledger. However, as noted in Investopedia, distributed ledger can more generally be described as a ledger of any transactions or contracts maintained in decentralized form across different locations and people, eliminating the need of a central authority to keep a check against manipulation." (http://www.investopedia.com/terms/d/distributed-ledgers.asp) Further, "the information on it is securely and accurately stored using cryptography and can be accessed using keys and cryptographic signatures. Once the information is stored, it becomes an immutable database and is governed by the rules of the network." A blockchain is a form of a decentralized or disbributed ledger, but blocks of data need not be "chained" together to constitute a distributed ledger. Maintaining the block chain or distributed ledger is referred to as "mining", and the "miners" (or more particularly, the mining nodes in the system) are awarded newly created bitcoins and transaction fees in return for mining the block-chain. Mining includes confirming the validity of transactions received over the network, and adding them to the block they are creating, and then broadcasting the completed block to other nodes. Techniques for maintaining and mining a block-chain are described for example, in WO 2015/077378A1, and US 2015/0356555 A1, which are hereby incorporated by reference in their entirety.

In the Bitcoin system, bitcoins can be kept in what is often referred to as a digital wallet, which is a computer program which "holds" or "stores" bitcoins. However, in the Bitcoin system, bitcoins are inseparable from the block chain or distributed ledger. Accordingly, a bitcoin wallet is a program which stores digital credentials for a given user's bitcoin holdings and allows that user to access and spend them. The Bitcoin system utilizes asymmetric cryptography, in which two cryptographic keys, one public key and one private key, are generated. A bitcoin wallet includes a collection of these keys, and typically also includes functionality to make bitcoin transactions.

Bitcoin wallet software, sometimes referred as being "bitcoin client software", allows a given user to transact bitcoins. A wallet program generates and stores private keys, and communicates with peers on the bitcoin network. An early wallet program called "Bitcoin-Qt" was released in the year 2009 by Satoshi Nakamoto as open source code; Bitcoin-Qt is also sometimes referred to as "Satoshi client". The wallet program can be used as a desktop wallet for payments or as a server utility for merchants and other payment services.

SUMMARY OF THE INVENTION

In accordance with a first embodiment of the present invention, a system is provided including a server and a plurality of computer nodes interconnected via the internet, which provides a secure method of maintaining and accessing files. Also provided are methods for operating the server and computer nodes, and non-transitory computer readable media for providing a secure method of maintaining and accessing files, comprising a first computer readable media including first computer executable process steps operable to control a server computer, and a second computer readable media including second computer executable process steps operable to control a computer node.

The first computer executable process steps are operable to control the server computer to perform steps including: dividing each of a plurality of files into unique file fragments or slices, encrypting each of the unique slices, distributing the unique slices to a plurality of computer nodes executing the second computer executable process steps such that no currently connected node receives all of the unique slices. In some variants, each computer node receives at least one of the unique slices. In other variants, only a subset of the active nodes may receive the unique slices. In either case, no currently connected node receives all of the unique slices or fragments. In the context of the present application, the terms "slices" and "fragments" are synonymous.

The first computer executable process steps also include distributing block chain (or distributed ledger) transactions to each of the plurality of computer nodes, wherein the block chain (or distributed ledger) transactions information for managing payment and access to the file fragments. The first computer executable process steps also include generating assembly information for each of the plurality of files, wherein the assembly information includes information sufficient to reassemble an instance of a file of the plurality of files from the unique slices associated with said file. In this regard, the assembly information may be stored in the blockchain, elsewhere on the nodes, or on a server or another computer on the network. The first executable process steps may also include communicating with the nodes to retrieve the assembly information sufficient to reassemble an instance of a file of the plurality of files from the unique slices associated with said file.

Although reference is made herein to "blockchains" and "blockchain transactions", it is to be understood that the present invention is equally applicable to other types of distributed ledgers, including, without limitation, distributing distributed ledger transactions, maintaining a distributed ledger and mining a distributed ledger.

In some variants, the plurality of nodes includes each connected node in the network, and in other variants, the plurality of nodes may include only a subset of the connected nodes, such that not every connected node necessarily receives a slice.

The second computer executable process steps are operable to control the computer node to perform steps comprising receiving and storing at least one of the encrypted unique slices which constitute each file of the plurality of files, but not all of the encrypted unique slices that constitute any one of said files; maintaining an instance of a public block-chain; and receiving and mining or executing the block chain (or distributed ledger) transactions from the server. In accordance with further optional aspects of this embodiment, the first computer executable process steps are operable to control the server computer to perform steps including paying each of the computer nodes in digital currency for mining and maintaining the public block chain (or distributed ledger) and for receiving storing the unique file fragments or slices. Each computer node preferably includes the second computer executable process steps.

In one variant of the above-referenced embodiment, the network includes N nodes, the files divided into slices of a predefined size, and the slices are distributed to some or all of the N nodes, wherein no single node holds more than 25% of the total number of slices stored on the network on N nodes. In other variants no single node holds more than 25% of the slices of any file.

In accordance with an alternative variant, the server specifies a minimum file size requirement per node (in kilobytes) is $Fsr=Fsn/N-A$ where $Fsr$=File size required per node (in kilobytes), $Fsn$=Total size of all files on the network (in kilobytes), N=total number of nodes on the network and A=Additional storage space which is voluntarily made available at the nodes.

In accordance with a second embodiment of the present invention, a system and computer implemented method of securely managing files among a plurality of computer nodes connected to a server over an peer-to-peer network or over an internet is provided. Also provided are non-transitory computer readable media having stored thereon computer executable process steps for performing the method. The method comprises (a) receiving a plurality of files from one or more of the nodes; (b) determining a number of the plurality of nodes currently connected to the server; (c) for each of the plurality of files: dividing the file into a number of unique slices (or fragments) of predetermined size, encrypting each of the unique slices, distributing the unique slices to a number of the currently connected nodes such that no currently connected node receives all of the unique slices; and (d) repeating steps (b) and (c).

In one variant, in step (c) the unique slices (or fragments) are distributed to a minimum number of the currently connected nodes such that no currently connected node receives all of the unique slices in accordance with minimum fragment replication parameters. In this regard, exemplary minimum fragment replication parameters include sending each fragment to a predefined number of nodes, thus replicating the file across the nodes providing redundancy should one of the nodes be unavailable. Distributed Hash Tables (DHTs), such as those used in Storj and IPFS (discussed below), may be used for tracking and distributing file fragments to nodes.

In another variant, in step (c) the number of unique slices is equal to at least a minimum number of nodes, the minimum number of nodes is set to a value no less than 100, preferably no less than 500, and more preferably no less than 1000, and no currently connected node receives all of the unique slices.

In another variant, in step (c) the number of unique slices is equal to at least the number of nodes and the the unique slices are distributed to all of the currently connected nodes such that each currently connected node receives at least one of the unique slices, and no currently connected node receives all of the unique slices;

In accordance with further optional aspects of the first and second embodiments, the plurality of files are media files selected from audio files, video files, text files, image files, and audio-video files.

In accordance with other and/or further optional aspects of the first computer executable process steps of the first embodiment, and the method of the second embodiment, the steps further include (a) receiving a request for a first file of the plurality of files from a first node of the plurality of nodes; (b) transmitting a private encryption key to the first node; (c) retrieving the unique slices corresponding to the first file from the currently connected nodes; (d) decrypting the unique slices; (e) accessing assembly information for the first file; (f) reassembling the unique slices into an instance of the first file; (g) encrypting the instance with a public key associated with the private key; and (h) transmitting the instance to the first node.

In accordance with other and/or further optional aspects of the first computer executable process steps of the first embodiment, and the method of the second embodiment, the steps further include transmitting the assembly information to each of the plurality of connected nodes as a block-chain transaction, and the block-chain transaction may also include information indicative of a price of the first file and/or a viewing limit for the first file. Further, the steps may further include destroying the instance when the viewing limit is exceeded.

In accordance with other and/or further optional aspects of the first computer executable process steps of the first embodiment, and the method of the second embodiment, the steps may also include receiving payment for the instance in crypto-currency. The steps may also comprise transmitting payment in crypto-currency to an owner of the first file, where the step of transmitting payment comprises sending a block-chain transaction to each of the connected nodes.

In accordance with other and/or further optional aspects of the first computer executable process steps of the first embodiment, and the method of the second embodiment, the steps may also include transmitting payment in crypto-currency to an owner of each of the plurality of nodes, where the step of transmitting payment comprises sending a block-chain transaction to each of the connected nodes, wherein an amount of said payment is proportional to an amount of storage on each node allocated to storing the unique slices. Further, the payment may also proportional to an amount of block-chain mining performed by each node.

In accordance with other and/or further optional aspects of the first computer executable process steps of the first embodiment, and the method of the second embodiment, the steps may also include transmitting payment in cryptocurrency to an owner of each of the plurality of nodes, where the step of transmitting payment comprises sending a further block-chain transaction to each of the connected nodes, wherein an amount of said payment is proportional to an amount of block-chain mining performed, and preferably proportional to an amount of storage allocated by each node to storing the unique slices.

In accordance with a third embodiment of the present invention, a system and computer implemented method of securely managing files on a computer node of the network is provided. Also provided are non-transitory computer readable media having stored thereon second computer executable process steps for performing the method. The steps comprise: (a) providing, on a computer, an instance of a public block chain (or distributed ledger); (b) receiving, from a server, for each of a plurality of files, a first transmission of at least one of a plurality of unique slices which constitute said each file, but not all of the plurality of unique slices which constitute said each file, wherein each unique slice is encrypted when received; (c) storing each of the received unique slices in memory; (d) receiving, from a server, for each of a plurality of files, a subsequent transmission of at least one of a plurality of unique slices which constitute said each file, but not all of the plurality of unique slices which constitute said each file, wherein each unique slice is encrypted when received; (e) discarding the unique slices stored in step c and storing in memory the unique slices received in step d; (f) receiving a block-chain transaction containing assembly information and payment information for one of the plurality of files; and (g) mining the block-chain using the block-chain transaction received in step f.

In accordance with a fourth embodiment of the present invention, non-transitory computer readable media are provided which comprise first computer readable media including first computer executable process steps operable to control a server computer as described above the regard to the first and/or second embodiments, and second computer readable media including second computer executable process steps operable to control a computer node as described above with regard to the first and third embodiments.

BRIEF DESCRIPTION OF THE DRAWINGS

FIG. 2 illustrates how increasing the number of nodes increases the number of slices, reduces the size of each slice, and reduces the slice storage requirements for each node.

FIGS. 6(a) to 6(c) illustrates the relationship between the number of nodes, number of files, number of slices, file size per slice, and file size requirements per node for in the context of storage of exemplary Television episodes.

FIGS. 7(a) to 7(c) illustrates the relationship between the number of nodes, number of files, number of slices, file size per slice, and file size requirements per node for in the context of storage of exemplary music files.

DETAILED DESCRIPTION

In accordance with an embodiment of the present invention, a secure method of maintaining and accessing files (for example, multimedia files) is provided. Each file is divided into fragments or slices and each slice is encrypted and stored on a separate node. As used herein, the terms "slice [s]" and "fragment[s]" are used synonymously. Each node is also required to maintain an instance of a public block-chain (or distributed ledger) which holds conventional block-chain transaction information for managing payment for access to the files. Each node also preferably holds assembly information for reassembling the slices into the files, either as part of the block-chain, or separately. Preferably, each node is also paid in digital currency both as a conventional block-chain miner for maintaining the public block-chain and also for maintaining the slices.

Figure 1:
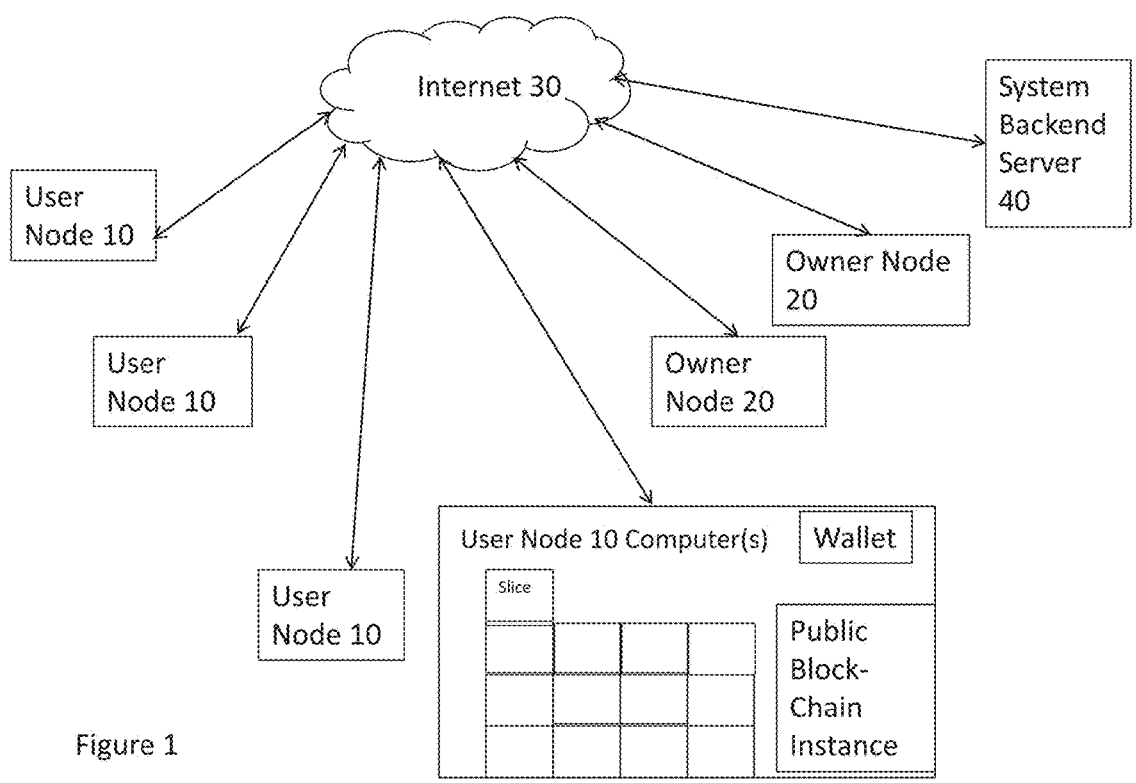
FIG. 1 shows an exemplary system diagram for an embodiment of the present invention.

FIG. 1 illustrates a system according to an embodiment of the present invention, including a plurality of user node computers 20, a plurality of owner node computers 30, and a backend server 40 interconnected via the internet 30 to form a network. Although we refer to a "node computer 10", it should be understood that each node could in fact be comprised of a network of computers. Similarly, although we refer to a "server", the server computer could in fact be implemented as a network of server computers.

Each node 10 and 20 (owner and user) is responsible for mining and maintaining an instance of the public block chain (or distributed ledger), and for maintaining a plurality of the encrypted slices. The backend server 40 is responsible for dividing the files into slices, encrypting the slices and distributing the encrypted slices to the nodes 10, 20. Each slice is "unique" in the sense that it needs to be reassembled in a particular sequence with the other slices to reconstitute the file. The backend server 40 also generates assembly information for each file, and is responsible for broadcasting the assembly information to the nodes 10, 20, preferably as a block-chain transaction ("assembly block-chain transaction") for publication in the public block-chain. Each of the nodes 10, 20 also implements a digital wallet for managing payment for access to the files and payment of miner fees for mining the block-chain and maintaining the slices.

As one of ordinary skill in the art will appreciate, commercially available software is available which can divide a file into slices or fragments, including, for example, Storj, IPFS, LxSplit, and HJ-Split, which are described in the following publications, incorporated herein by reference: Shawn Wilkinson et al, Storj, A Peer-to-Peer Cloud Storage Network (Dec. 15, 2016), Gabriel Comte, LIBRARY DEVELOPMENT FOR STORJ CLOUD CLIENTS IN UNSUPPORTED ENVIRONMENTS (2017); Lxsplit, http://lxsplit.sourceforge.net/ (Oct. 17, 2008); Manual For HJSplit for Windows, http://www.freebyte.com/hjsplit/manual/(Dec. 3, 2010), Benet, IPFS—Content Addressed, Versioned, P2P File System (DRAFT 3) (Jul. 14, 2014).

In one variant of the present invention, the number of nodes on the network preferably is equal to the number of fragments or slices that a file is split into, and each node holds at least one slice from each file. To implement this, the backend server monitors the number of active nodes (defined as nodes logged on to the network), and continually repeats the process of dividing the files into slices, encrypting the slices (preferably using AES-128 or AES-125 encryption protocols to enhance file security) and distributing the encrypted slices to the active nodes. Preferably, this would be done in response to changes in the status of nodes. For example, when a node goes offline, it will send an alert to the backend server which will recalculate and redistribute the number of slices. Similarly, when a node comes online, it will send an alert to the backend server as well which will similarly recalculate and redistribute the slices amongst the nodes. Utilizing an alert-based system ensures that the appropriate number of slices are on the entire population of nodes at any given time. Alternatively, this process can be repeated at fixed intervals (e.g., every 5 seconds, 3 seconds, 1 second). It should be noted that since the block chain transaction (which includes the assembly information, price and time of access information, and timestamp) is published in the public block-chain, it does not need to be resent.

In any event, when a node receives an updated set of encrypted slices, it discards the prior set of encrypted slices. The system requires each node to allocate a minimum amount of storage size proportional to the total number of active nodes and the total size of all files on the network.

In another variant of the present invention, the number of nodes on the network preferably is not necessarily equal to the number of fragments or slices that a file is split into. To implement this, the backend server monitors the number of active nodes (defined as nodes logged on to the network), encrypts the slices (preferably using AES-128 or AES-125 encryption protocols to enhance file security) and distributes the encrypted slices to some or all of the active nodes in accordance with minimum fragment replication parameters. In this regard, exemplary minimum fragment replication parameters include sending each fragment to a predefined number of nodes, thus replicating the file across the nodes providing redundancy should one of the nodes be unavailable. When a node receives an updated set of encrypted slices, it discards the prior set of encrypted slices. The system requires each node to allocate a minimum amount of storage size, preferably about 100 MB.

The systems and methods according to the various embodiments of the present invention may provide a decentralized and anonymous system which will allow for the control, storage, security and exchange of multimedia files. The system can be used by users and multimedia owners to securely exchange information and prevent piracy through the use of a plurality of user and owner nodes, each managing a public block-chain and storing an encrypted slice of each multimedia file. The system may also provide multimedia owners with the ability to set predetermined prices for their intellectual property, preferably through functions executing on the owner nodes.

The system may also provide users and multimedia owners with the ability to interact and exchange property stored on a nodal network for fiat currency. In this regard, each of the user and owner nodes may be provided with a digital wallet (e.g., a bitcoin wallet or Ethereum wallet, as examples) for exchanging fiat currency for crypto-currency (herein referred to as "slice currency"), and for executing financial transactions using the public block-chain. The nodes are rewarded in slice currency both for storing file slices and processing transactions on the block-chain. The slice currency can then be used to access multimedia or transferred into alternate (e.g. fiat) currencies by the backend server for an exchange fee.

Preferably, the system enables the establishment of contracts between multimedia artists and users that is stored and processed on the public block-chain. For example, this functionality could be integrated into the user and owner nodes, either in the digital wallet or in a separate program. For example, Ethereum (https://www.ethereum.org) provides Ethereum Wallet which allows users to hold and secure crypto-assets, as well as to write, deploy and use smart contracts.

The organization of the system of FIG. 1 will now be described in further detail. The system requires at least two nodes to be active in order to operate. However, the system is designed to leverage thousands of nodes in order to increase processing time and decrease node storage requirements. Two alternative implementations will be described in reference to FIG. 1.

In a first implementation, each node will be responsible for maintaining a minimum available storage space. Nodes can opt to allocate additional network storage space in exchange for additional crypto currency.

In a second implementation, each node will be responsible for maintaining storage space for a certain size of file slices which is proportional to the number of nodes (user and owner) in the network. Nodes can opt to allocate additional network storage space in exchange for additional slice currency. This additional network space will reduce the minimum file size per node. Preferably, the equation for the minimum file size requirement per node (in kilobytes) is $F_{sr}=F_{sn}/N-A$ where $F_{sr}$=File size required per node (in kilobytes), $F_{sn}$=Total size of all files on the network (in kilobytes), N=total number of nodes on the network and A=Additional storage space allocated by miners.

In this second implementation, each node is responsible for at least one slice per file. For example, if there are 1000 files on a network of 1000 nodes, and no node has allocated additional storage space (A=0), each node would be responsible for 1 slice per file, and there would be 1,000,000 file slices. This architecture is advantageous because it allows for a constant number of file slices to be distributed evenly among the entire network of nodes. Further, because each node has at least one slice of every file, any attempt to hack the system would require the hacker to breach every single node on the network, as every node has a slice of each file. FIG. 2 illustrates how, in a system with 3500 files, increasing the number of nodes increases the number of slices, reduces the size of each slice, and reduces the slice storage requirements for each node.

In both implementations, the system preferably enforces a limit on the amount of additional storage that can be allocated at any given node, in order to ensure that the distribution of slices is such that no single node maintains an unacceptably large portion of the slices of file. In certain variants, preferably, no single node can be allocated no more than 25%, preferably no more than 10%, and more preferably no more than 5% of the total network storage. In other variants, preferably no single node can be allocated no more than 25%, preferably no more than 10%, and more preferably no more than 5% of the slices of a file.

Each node (e.g., which may include user and owner nodes) storing fragments or slices preferably acts as a block-chain miner and is responsible for processing a number of transactions occurring on the public block-chain. Techniques for mining and updating block-chains are well known, and accordingly are not repeated in detail herein.

Mining is preferably implemented into a GUI application at the node. Through a background process, the application will process transactions and keep track of the time and size of storage allocated. Miners will be rewarded for transactions per second as well as size allocated per second. The number of transactions required per miner is proportionally dependent upon the number of transactions demanded, and changes based on the number of active nodes on the network. Preferably, the formula is: P=T/N where P=Number of transactions processed, T=Number of queued transactions, and N=Number of active nodes.

Each node is preferably rewarded based on the number of the transactions it processes and based on the network storage space allocated in the node for slices. Preferably, the award is constant in order to incentivize miners to mine on the block-chain and to support the transactions in the system. As an arbitrary example, miners might be awarded one slice per 100,000 transactions processed as well as one slice per 1,000 file slices stored per node per day. The reward values are based on the parameters set when creating the Genesis block (i.e., the first block of a block-chain). For example, one block of Bitcoin transactions contains a reward of 12.5 bitcoins currently. In the bitcoin network, the time to process a block of transactions is static and the difficulty variable adjusts accordingly to maintain the process time. The systems described herein in accordance with the present invention can be implemented in a similar fashion.

As discussed above, in one variant, each node stores, in addition to its instance of the block-chain, encrypted slices which are received from the backend server. At the backend server, each file is divided into a number of slices and the slices are encrypted before being distributed to the nodes. Advantageously, each slice is encrypted using the smallest (in terms of bit size) available encryption algorithm based on number of slices to allow for maximum security while also maintaining viability of each node. Preferably an AES-128 or AES-125 encryption algorithm can be used. In another variant, each node stores, in addition to its instance of the block-chain, encrypted slices which are received from the backend server. At the backend server, each file is divided into a number of slices of a predetermined size and the slices are encrypted before being distributed to a predefined minimum of nodes to insure availability of replication of all the slices (or fragments) required to reassemble the original file. Advantageously, each slice is encrypted using the smallest (in terms of bit size) available encryption algorithm based on number of slices to allow for maximum security while also maintaining viability of each node. Preferably an AES-128 or AES-125 encryption algorithm can be used.

Figure 3:
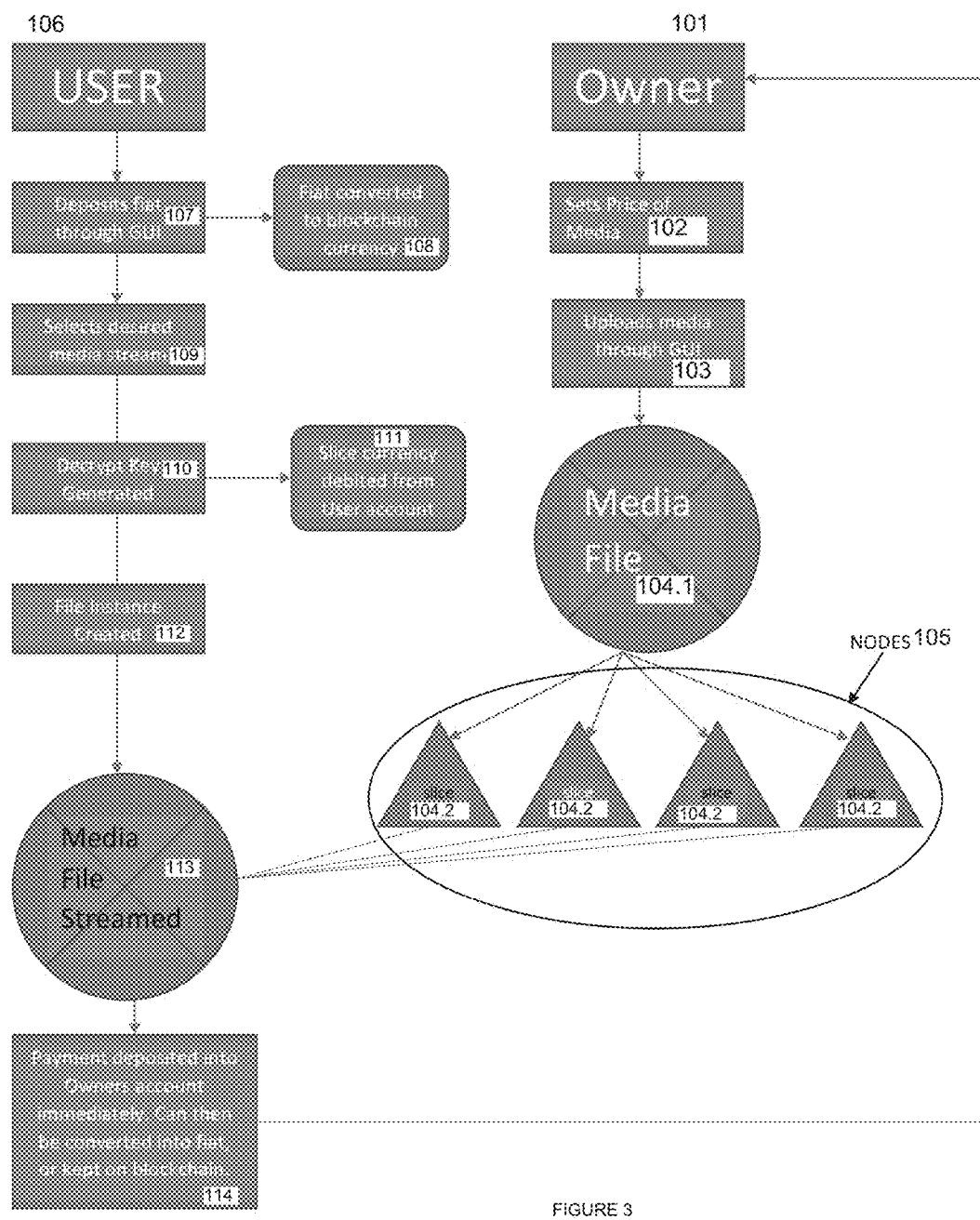
FIG. 3 is an illustrative flow chart for owner and user processes for the system of the embodiment of FIG. 1.
Figure 4:
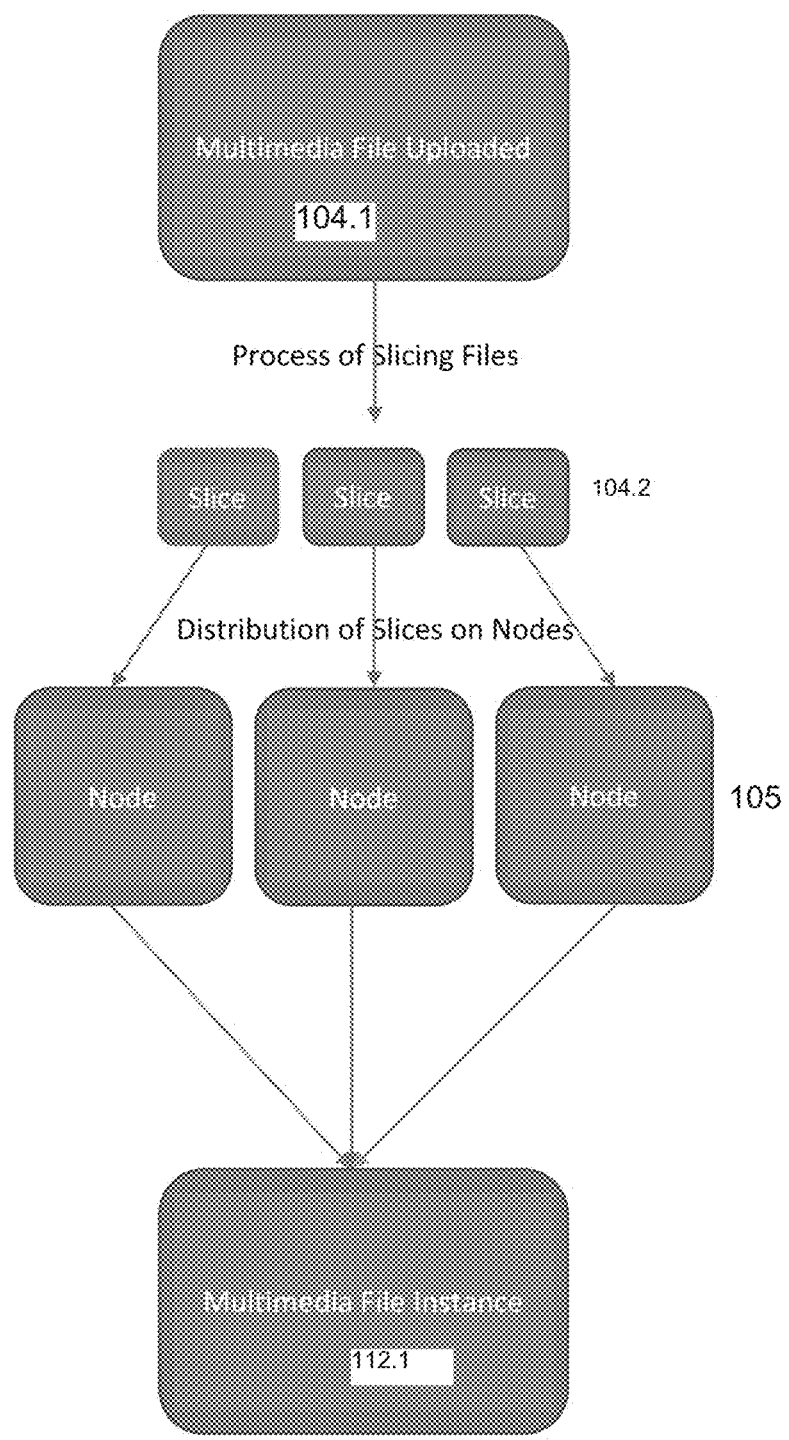
FIG. 4 is an illustrative flow chart which illustrates the uploading of a multimedia file, dividing it into slices, distribution to nodes, and reassembly as a file instance.
Figure 5:
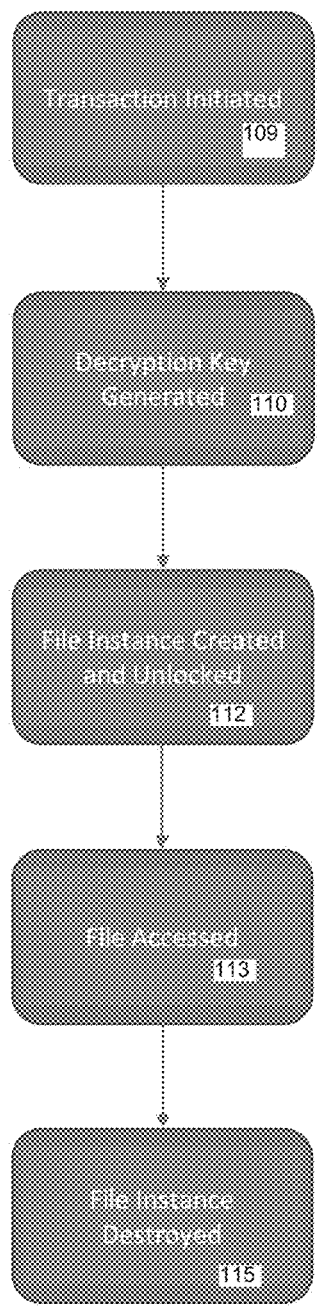
FIG. 5 is an illustrative flow chart which illustrates the accessing, and optional destruction of, a file instance.

A process for using the system will now be described from the perspective of the users and owners with reference to the flow charts of FIGS. 3-5.

Using a graphical user interface (GUI) executing on the owner node, an owner 101 sets the price (step 102) for a media file(s) and uploads the media file(s) (step 103) to the Backend Server. At the back end server, each file 104.1 is divided into a plurality of slices and encrypted 104.2, and distributed to the nodes. In the first variant, at least one slice for each file is transmitted to each node in the network (step 105). In the other variant, the slices are distributed to a predefined minimum of nodes to insure availability of replication of all the slices (or fragments) required to reassemble the original file. The back end server also generates assembly information for each file which indicates how the slices are to be combined to recreate the file as a multimedia file instance 113. Exemplary publically available software products for dividing a file into fragments or slices and generating assembly information is "lxsplit" available from Source Forge (www.lxsplit.sourceforge.net) and from "hjsplit" available from Freebyte (www.hjsplit.org/linux), Storj (https://storj.io/), and IPFS (https://ipfs.io/), . . . Encryption may, for example, be implemented with an AES encryption (Advanced Encryption Standard) algorithm such as an AES-125 or AES-128 algorithm. This assembly information, along with the public key (i.e., the public key for the transaction sender, in this case the Backend Server), transaction time, price and time setting (i.e. the price and time period for the lease of the file), and payor and payee information, is incorporated into to a block-chain transaction which is broadcast to all nodes when a file is purchased by a user. Alternatively, instead of the assembly information, other information sufficient to identify the file can be included in the transaction. In any event, each node then mines the block-chain transaction and maintains its instance of the public block-chain in a conventional manner. At this point, each node in the system includes an instance of the block-chain (which includes the assembly and other transaction information) as well as at least one encrypted slice for each file in the system. Although the assembly information is preferably incorporated into the block-chain, it can alternatively be stored elsewhere in the nodes or on the backend server.

Using a graphic user interface (GUI) executing on a user node, a user 106 deposits fiat currency (step 107). This fiat currency is then converted to slice currency through interaction between the GUI and backend server in a conventional manner (step 108). The user then selects a desired media file through the GUI (step 109). A private decryption key is generated by the Backend server and sent to the user GUI, and the slice currency is debited from the user account (step 111). Using the decryption key, the Backend Server creates a file instance (step 112). The backend server then uses the assembly information to identify and locate the slices, retrieves and decrypts the slices 104.2 from the nodes, assembles the slices into an instance of the media file 112.1, and streams (or, alternatively, downloads) the media file to the user (step 113). This transaction is published in the block-chain by broadcasting an assembly transaction to the nodes (as described above), which in turn, mine and update the public block-chain.

Payment for the purchase is then deposited as slice currency to the owner's account, preferably via the same block-chain transaction (step 114). Alternatively, payment could be made in a separate block-chain transaction. This slice currency can then converted to fiat currency through interaction between the GUI and backend server in a conventional manner. If the file instance was leased or streamed for a limited time or limited number of downloads (e.g. a use limitation), the file instance is destroyed (step 115) when the use limitation is exceeded.

Returning to steps 110 and 112, each file instance has its own encrypt and decrypt key. In addition, each slice is encrypted, as is the block chain (or distributed ledger). The decryption keys will be exchanged between owners and users automatically in the background using the Graphic User Interface (GUI) using conventional techniques. Each encryption and decryption key will exist for one instance of the contract (sale, lease) between the owner and users, and will expire when the contract expires to prevent piracy. Each User and Owner key may be set to expire after a time interval after which they will change to add another layer of security. The arrangement in which the file is assembled from the slices creates a new instance of a transaction and further adds to security because each new instance is attributed its own encrypt key and decrypt key with which to unlock the file. This arrangement of encryption and decryption creates hundreds of millions of different possible instances for each individual file and utilizes redundancy to increase access time and security. This is preferably implemented into the backend server. When a file is purchased for access, the backend server uses the assembly information to identify the file slices, decrypts the slices using generated decrypt keys, and generates a new instance of the file with a public key which corresponds to the private key sent to the user. The backend server essentially creates an encrypted "snapshot" or stream of the file based on the assembly of slices. This "snapshot" will be assigned a decrypt key (by the backend server) which grants the purchaser access to the file. The user, through a background process in the GUI, uses the decrypt key to decrypt the file instance.

In one variant, the decrypted snap shot is stored on the purchasers node, and once the file is no longer contractually available, the decrypted "snapshot" is destroyed or made inaccessible using conventional DRM (Digital Rights Management) techniques. Once the transaction is initiated, it is then processed on the public block-chain and recorded to prevent theft and piracy as described above.

In another variant, once the file is accessed, the "snapshot" is destroyed, and the backend will create a new "snapshot" for each subsequent transaction. Then, after the allotted time interval, the backend server destroys the file instance. Once the transaction is initiated, it is then processed on the public block-chain and recorded to prevent theft and piracy as described above.

Additionally, the user node may utilize daemons to analyze and determine whether additional recording equipment is connected, and will prevent media streaming if detected. This provides an additional layer of security.

As an additional security option, the assembly information itself may be divided into slices by the backend server, encrypted and sent to the nodes in the same manner as the file slices. The backend server would then maintain a record of the arrangement of the assembly information slices, and access them in the same manner as described above with respect to the file slices. In particular the system could include one nodal network that distributes file slices to nodes and a separate nodal network that distributes assembly information of the slices to nodes. The two nodal networks would be connected to each other and communicate with each other in terms of number of files/slices that are on the network as well as the information for how the slices can be assembled. In this way all of the critical information for the forming of the file could be decentralized and secure rather than on one backend server computer. In this case, slice assembly information would be extrapolated from one nodal network and sent to the second nodal network which actually stores the slices. The second network would then assemble/disassemble the file slices for client access.

In order to illustrate the scalability, applicability and advantages of the afore-mentioned system and method, a few applications will be discussed.

First, we consider providing nodes and storage for TV Episodes using AES-128 encryption in variants in which each active node stores at least one slice of each file. Assume the network starts out with 1,000 active nodes and no one is allocating additional space to the network (A=0) (e.g., one slice of each file at each node). Assume that the network initially starts with 3,500 TV shows supplied by various different owners. Based on a TV show's average respective file size (200 MB), there would be an average total of 700 GB Gigabytes (GB) of multimedia files on the network. Since there is 1 slice per file per node, there would be a total of 3,500,000 different file slices distributed between the 1,000 nodes, and each slice would be allocated 0.0002 GB, or 200 KB. Each node would hold 3,500 slices (the same as the number of files on the network). Therefore each node would be responsible for 700 MB worth of file slices. Due to the requirements for sustaining the network, each node would be responsible for maintaining all of the files on the network. In this case, each node would be responsible for storing 700 MB worth of encrypted slices in a dedicated encrypted folder on their device. As illustrated in FIG. 6a, if the number of nodes remains constant and the number of files increases from 3500 to 1,000,000, the file size requirements per node will increase from 0.7 GB to 200 GB without compression.

As discussed above, if one or more clients join or leave the network, the number of "slices" gets readjusted so that each client maintains an equal number of "slices" (all the work is evenly distributed across the network). The more clients that join in proportion to the number of files on the network, the smaller each individual file slice becomes, and the less space each Node needs to allocate to the slice network. As illustrated in FIG. 6b, if the number of files remains constant at 3500 and the number of nodes increases from 1,000 to 1,000,000, the file size requirements per node will decrease from 700 MB to 0.7 MB and the slice size will decrease from 200 KB to 0.2 KB without compression. FIG. 6 C illustrates the case were the number of files and the number of nodes increase. Additionally, if a node opts to allow additional storage space for the network, the minimum file size requirement per node is reduced by A, and that node gets rewarded accordingly in slice currency.

As a second example, we will consider providing nodes and storage for songs using AE-125 encryption in variants in which each active node stores at least one slice of each file. In this illustration, we will assume that the average file size per song 3.5 MB (Uncompressed), that the network initially has 1,000 active nodes, and that the network initially holds 100,000 songs supplied by various different owners. Based on the average file size per song, there would be 3500.00 GB of song files on the network of 1,000 Nodes. Assuming no node allocates additional space (i.e., there is 1 slice per file per node), there would be a total of 100,000,000 slices on the network. Each slice would be encrypted using AES-125 encryption to allow for smallest possible file slice size, and each slice would be compressed using a 10:1 compression ratio (done before encryption). Accordingly, each slice would be allocated 3.5 KB and each node would be responsible for allocating 350 MB worth of space to the network. As illustrated in FIG. 7A, if the number of nodes remains constant (1000) and the number of files increases from 100,000 to 80,000,000, the file size requirements per node will increase from 3.5 GB to 2800 GB without compression. As illustrated in FIG. 7b, if the number of files remains constant at 10,000 and the number of nodes increases from 1,000 to 1,000,000, the file size requirements per node will decrease from 122.5 MB to 00.1224 MB and the slice size will decrease from 35 KB to 0.035 KB without compression. FIG. 7 C illustrates the case were the number of files and the number of nodes increase.

As a third example, we will illustrate, from the perspective of the user and the owner, how a transaction is processed.

From the User's Perspective: A user wants to purchase and access a multimedia file located on the network. In order to do so, the user downloads and installs a Client Graphical User Interface (GUI) for the system. Upon installing the software, the user then automatically begins acting as a user node, allocating the calculated minimum storage space for "slices" on the network, reducing the overall individual load of the network. After installing the software and creating an account, a wallet address is generated (in the background) which enables users to deposit funds with which to purchase the desired file. The wallet's address is hidden from the client, and a balance in the fiat value of slice currency in the wallet is shown as an account balance. Once the wallet address is generated and connected to a specific account the user deposits fiat currency using debit, credit, or bank account. Upon depositing fiat into their account, the money gets automatically transferred into the equivalent value of slice currency using the back-end server. When the user buys the file, they transfer the fiat equivalent value of the price in slice currency to the owner (through a block-chain transaction), and unlock the file for the predetermined time period as described above with respect to FIGS. 3-5. The wallet can be implemented as a conventional digital currency wallet, such as those provided as bitcoin wallet or ethereum wallet described above.

From the Owner's Perspective, an owner uploads their files onto the backend server, which then get sliced and distributed to all of the active nodes. The owner sets a price using a web interface or Graphic User Interface for each file uploaded and attributes the price to a predetermined access time. For example, a musician could upload one song and set the price of $0.01 for an access time of the length of the song. This would set the price of the song per stream at $0.01. When a user purchases their song, the musician gets transferred the $0.01 worth of slice currency minus the exchange rate into their account balance. As an example, the exchange rate may have a base value of (4%) but may also be flexible based on the specific owner (e.g., a sliding scale based on volume). As an example, the more songs streamed, the higher the exchange rate (up to a maximum of 7%), and the less songs streamed the lower the exchange rate (down to a minimum of 1%). As described above, when the transaction between a user and an owner occurs, block chain (or distributed ledger) transactions are initiated in a conventional manner, and then processed by miners and published on the public block-chain.

It should be noted that although the system is described above in the context of separate user nodes and owner nodes, it is of course also possible to provide a single GUI which provides both user and owner functionality. In other words, a node could function as both a user (for purchasing and using content) and an owner (as a content provider).

A number of incentives can be built in to the system. For example, User Incentives may include: rewards for storage size contributions to the network; free access to multimedia based on generated slice currency from size of files stored (or payment in fiat currency if slice currency is exchanged for money rather than multimedia access). In other words, the users are rewarded for using software with free multimedia tokens, which can be exchanged for fiat currency. Promotions, offers, and deals may also be provided to encourage growth and popularity. Owner Incentives may include: control over the price of their digital intellectual property; security of their intellectual property through proprietary encryption and block-chain system; the transparency of the block-chain ledger; an instantaneous and secure payment system; a decentralized storage network; the potential for instantaneous feedback from users through the system or other options for collaboration with users. The system also provides systematic incentives to both users and owners, which may include: Rewards for miners to process transactions, based on volume of processes transacted; and rewards for miners for allocating storage space.

Figure 8:
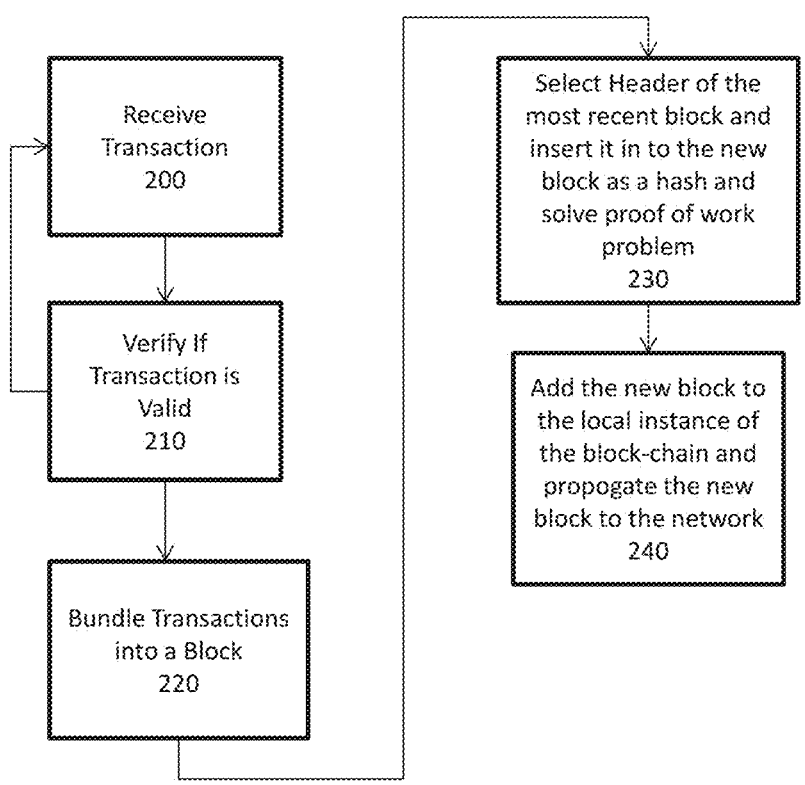
FIG. 8 is a flow-chart providing an illustrative method of mining a block chain.
Figure 9:
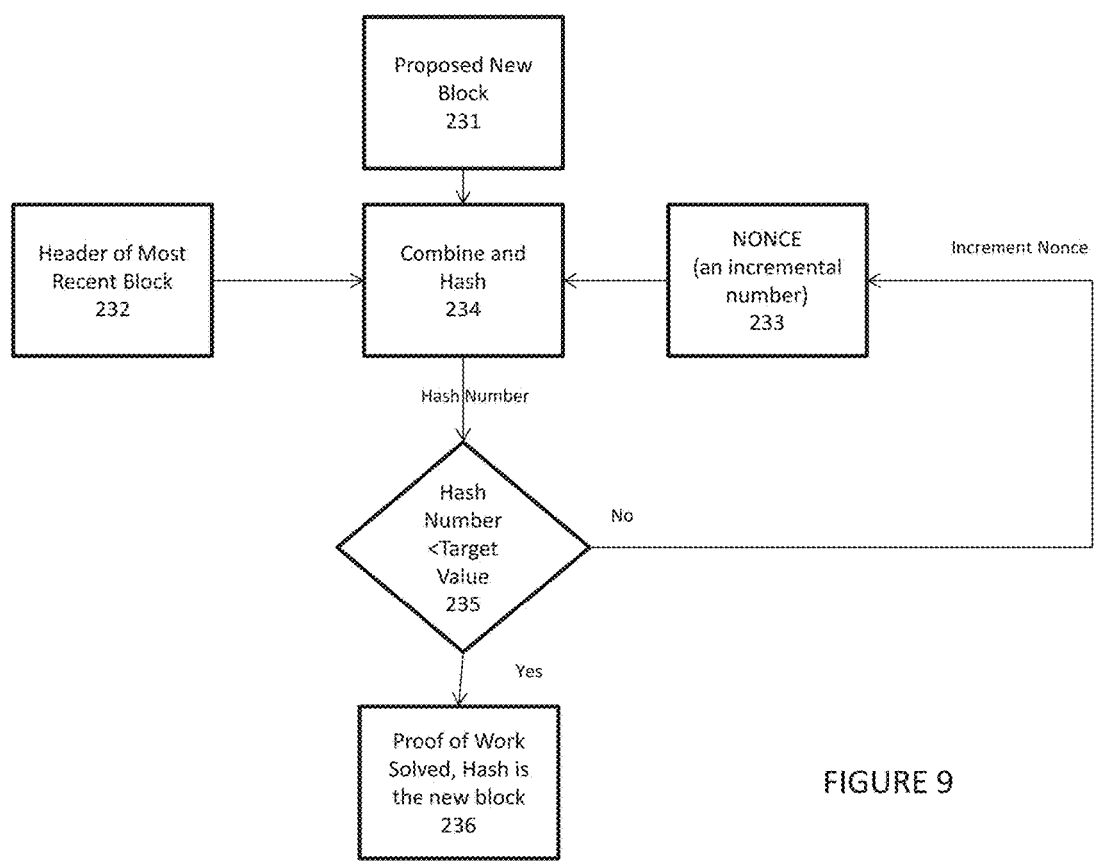
FIG. 9 is a flow-chart providing an illustrative method of performing a proof of stake (or proof of work) for the method of FIG. 8.

As discussed above, price information for the file, time of access for the file, and timestamp (of when the file was sliced and/or purchased), and preferably the assembly information for a file, are published on the block-chain as a block-chain transaction. This information could be in a single transaction, or in separate transactions. In addition, conventional block-chain transactions are published on the block-chain, for example, payments for files, payments for mining, payments for slice storage. In any event, the block-chain transactions are then mined at each node in a conventional manner. Exemplary flow charts for mining the block-chain are shown in FIGS. 8 and 9. These steps are performed at each of the nodes 10, 20.

At step 200, a node (10, 20) receives block-chain transactions. The node verifies if the transaction is valid (210) and after receiving a number of block-chain transactions bundles the transactions into a proposed new block (220). The node then selects header of the most recent block on the block-chain and inserts it into the new block as a hash with a nonce, and then solves the proof of work or proof of stake problem (230). Once the proof of work or proof of stake problem is solved, then the new block is added to the local instance of the block chain at the node, the new block is propagated to the network (240), and the node is rewarded in slice currency for mining (which reward is itself later recorded via a different block-chain transaction).

The proof of work or proof of stake process (230) is illustrated in further detail in FIG. 9. The proposed new block is combined with the header of the most recent block (232) and a nonce (233) (a number that is incremented) and hashed (234) to generate a hash number. The hash number is then compared with a target value (235). The target value is typically a 256 bit number which is changed periodically (e.g. every 2016 blocks) to maintain a preselected level of difficulty. If the hash number is less than the target value (235), then the proof of work or proof of stake is considered solved, and the hash number is the new block (236). If the hash number is not less than the target value (235), then the nonce is incremented and the proposed new block is again combined with the header of the most recent block (232) and a nonce (233) and hashed (234) to generate a new hash number, and the process repeats itself until the hash number is less than the target value.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. Non-transitory computer readable media for providing a secure method of maintaining and accessing files, comprising a first computer readable media including first computer executable process steps operable to control a server computer, and a second computer readable media including second computer executable process steps operable to control a computer node, wherein the first computer executable process steps are operable to control the server computer to perform steps including:

dividing each of a plurality of files into unique slices, generating assembly information for each of the plurality of files, wherein the assembly information includes information sufficient to reassemble an instance of a file of the plurality of files from the unique slices associated with said file, encrypting each of the unique slices, distributing the unique slices to a plurality of computer nodes executing the second computer executable process steps such that no currently connected node receives all of the unique slices, distributing distributed ledger transactions to each of the plurality of computer nodes, wherein the distributed ledger transactions include information for managing payment for access to the files, and wherein the second computer executable process steps are operable to control the computer node to perform steps comprising receiving and storing at least some of the encrypted unique slices, but not all of the encrypted unique slices that constitute any one of said files;

maintaining an instance of a public distributed ledger;

receiving and mining the distributed ledger transactions from the server;

transmitting payment in crypto-currency to an owner of each of the plurality of nodes, where the step of transmitting payment comprises sending a block-chain transaction to each of the connected nodes, wherein an amount of said payment is proportional to an amount of storage on each node allocated to storing the unique slices.

2. The computer readable media of claim 1, wherein the first computer executable process steps further comprise distributing the assembly information to each of the plurality of nodes.

3. The computer readable media of claim 1, wherein the distributing distributed ledger transactions includes distributing the assembly information.

4. The computer readable media of claim 1, wherein the distributing the unique slices includes distributing the unique slices the plurality of computer nodes executing the second computer executable process steps such that each computer node receives at least one of the unique slices and no currently connected node receives all of the unique slices.

5. The computer readable media of claim 1, wherein the first computer executable process steps further comprise communicating with one or more of the plurality of nodes to retrieve the assembly information.

6. The computer readable media of claim 1, wherein the first computer executable process steps are operable to control the server computer to perform steps including paying each of the computer nodes in digital currency for mining and maintaining the public distributed ledger and for storing the unique slices.

7. A computer implemented method of securely managing files, comprising the steps of:
   (a) providing, on a computer, an instance of a public distributed ledger;
   (b) receiving, from a server, for each of a plurality of files, a first transmission of at least one of a plurality of unique slices which constitute said each file, but not all of the plurality of unique slices which constitute said each file, wherein each unique slice is encrypted when received;
   (c) storing each of the received unique slices in memory;
   (d) receiving, from a server, for each of a plurality of files, a subsequent transmission of at least one of a plurality of unique slices which constitute said each file, but not all of the plurality of unique slices which constitute said each file, wherein each unique slice is encrypted when received;
   (e) discarding the unique slices stored in step c and storing in memory the unique slices received in step d;
   (f) receiving a distributed ledger transaction containing payment information for one of the plurality of files, the payment information being for payment in crypto-currency, wherein an amount of said payment is proportional to an amount of storage on the computer allocated to storing the unique slices;
   (g) Mining the distributed ledger using the distributed ledger transaction received in step f;
   (h) receiving payment in crypto-currency, where the step of receiving payment comprises receiving a block-chain transaction, wherein an amount of said payment is proportional to an amount of storage on the computer allocated to storing the unique slices.

8. Computer readable media, having stored thereon, computer executable process steps operable to control a computer to perform the steps of claim 7.

9. Non-transitory computer readable media, comprising a first computer readable media including first computer executable process steps operable to control a server computer, and a second computer readable media including second computer executable process steps operable to control a computer node,
   wherein the first computer executable process steps are operable to control the server computer to perform steps including:
   (a) receiving a plurality of files from one or more of a plurality of computer nodes, each of the plurality of computer nodes executing the second computer executable process steps;
   (b) determining a number of the plurality of nodes currently connected to the server;
   (c) for each of the plurality of files:
      dividing the file into a number of unique slices of predetermined size,
      encrypting each of the unique slices,
      distributing the unique slices to the currently connected nodes such no currently connected node receives all of the unique slices;
   (d) Repeating steps (b) and (c); and
   wherein the second computer executable process steps are operable to control the computer node to perform steps comprising:
   (a) providing, on a computer, an instance of a public distributed ledger;
   (b) receiving, from the server executing the first computer executable process steps, for each of the plurality of files, a first transmission of at least one of the encrypted unique slices which constitute said each file, but not all of the encrypted unique slices which constitute said each file;
   (c) storing each of the received unique slices in memory;
   (d) receiving a distributed ledger transaction containing assembly information and payment information for one of the plurality of files;
   (e) Mining the distributed ledger using the distributed ledger transaction received in step d; wherein the first computer executable process steps further include transmitting payment in crypto-currency to an owner of each of the plurality of nodes, where the step of transmitting payment comprises sending a block-chain transaction to each of the connected nodes, wherein an amount of said payment is proportional to an amount of storage on each node allocated to storing the unique slices.

10. The computer readable media of claim 9, wherein the number of unique slices is equal to at least the number of nodes, and wherein the distributing the unique slices to the currently connected nodes includes distributing the unique slices to the currently connected nodes such that each currently connected node receives at least one of the unique slices, and no currently connected node receives all of the unique slices.

11. The computer readable media of claim 9,
wherein the first computer executable process steps are operable to control the server computer to perform steps including further comprising the steps of:
(a) receiving a request for a first file of the plurality of files from a first computer node of the plurality of computer nodes executing the second executable process steps;
(b) receiving payment for the instance in crypto-currency;
(c) transmitting a private encryption key to the first node;
(d) retrieving the unique slices corresponding to the first file from the currently connected nodes;
(e) decrypting the unique slices;
(f) accessing assembly information for the first file;
(g) reassembling the unique slices into an instance of the first file;
(h) encrypting the instance with a public key associated with the private key;
(i) Transmitting the instance to the first node; and
(j) transmitting the assembly information to each of the plurality of connected nodes as the distributed ledger transaction.

12. A system for providing a secure method of maintaining and accessing files, comprising a server and a plurality of computer nodes interconnected via the internet, wherein:
the server includes the first computer readable media of claim 1, and executes the first computer executable process steps;
each of the plurality of computer nodes includes the second computer readable media of claim 1 and executes the second computer executable process steps.

13. A system for providing a secure method of maintaining and accessing files, comprising a server and a plurality of computer nodes interconnected via the internet, wherein:
the server includes the first computer readable media of claim 9, and executes the first computer executable process steps;
each of the plurality of computer nodes includes the second computer readable media of claim 9 and executes the second computer executable process steps.

14. The method of claim 1, wherein the public distributed ledger is a public block chain.

15. The method of claim 7, wherein the public distributed ledger is a public block chain.

16. The method of claim 9, wherein the public distributed ledger is a public block chain.

* * * * *